United States Patent
Taylor et al.

(10) Patent No.: US 10,280,009 B2
(45) Date of Patent: May 7, 2019

(54) CONVEYOR SYSTEM THAT SENSES AND SEPARATES PRODUCT

(71) Applicant: Walmart Apollo, LLC, Bentonville, AR (US)

(72) Inventors: Robert James Taylor, Rogers, AR (US); Jason Bellar, Bella Vista, AR (US); John Crecelius, Springdale, AR (US); William M. Propes, Bentonville, AR (US); Matthew David Alexander, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/910,168

(22) Filed: Mar. 2, 2018

(65) Prior Publication Data
US 2018/0251318 A1  Sep. 6, 2018

Related U.S. Application Data

(60) Provisional application No. 62/466,095, filed on Mar. 2, 2017.

(51) Int. Cl.
*B65G 43/08* (2006.01)
*B65G 47/28* (2006.01)
(Continued)

(52) U.S. Cl.
CPC .............. *B65G 43/08* (2013.01); *B65G 13/04* (2013.01); *B65G 13/11* (2013.01); *B65G 41/008* (2013.01);
(Continued)

(58) Field of Classification Search
CPC ........ B65G 43/08; B65G 47/31; B65G 47/26; B65G 47/28; B65G 43/10
(Continued)

(56) References Cited

U.S. PATENT DOCUMENTS 3,628,632 A   12/1971   Lambert
4,832,204 A   5/1989   Handy
(Continued)

FOREIGN PATENT DOCUMENTS

GB    1571270 A    7/1980

OTHER PUBLICATIONS

Application and File History for U.S. Appl. No. 15/910,174, filed Mar. 2, 2018, Inventors: Taylor.
(Continued)

*Primary Examiner* — James R Bidwell
(74) *Attorney, Agent, or Firm* — Patterson Thuente Pedersen, P.A.

(57) ABSTRACT

Embodiments of a conveyor system for separating cases of product are disclosed. An elongated, substantially horizontal frame extends from an entry point to an exit point and has a plurality of linear zones. A plurality of motivators is arranged along the frame, such that a case placed on one or more motivators will be moved forward toward the exit point by a coordinated movement of the motivators. A plurality of case sensors arranged along the frame detects the presence of one or more cases within each of the linear zones, and a controller activates the motivators such that a minimum time period elapses between cases delivered to the exit point. The system can include an AC/DC power supply configured to receive 110-120V alternating current power at 60 Hz and to provide direct current power to the controller, the plurality of case sensors, and the plurality of individually-controllable motivators.

12 Claims, 3 Drawing Sheets

(51) Int. Cl.
  *B65G 13/04* (2006.01)
  *B65G 41/00* (2006.01)
  *B65G 13/11* (2006.01)

(52) U.S. Cl.
  CPC ........ *B65G 47/28* (2013.01); *B65G 2201/025* (2013.01); *B65G 2203/0233* (2013.01); *B65G 2203/041* (2013.01); *B65G 2203/042* (2013.01); *B65G 2203/044* (2013.01)

(58) Field of Classification Search
  USPC ............................................ 198/460.1, 860.1
  See application file for complete search history.

(56) References Cited

U.S. PATENT DOCUMENTS

| | | | |
|---|---|---|---|
| 5,131,499 A | 7/1992 | Hoar | |
| 5,213,145 A | 5/1993 | Huang | |
| 5,285,887 A * | 2/1994 | Hall | B65G 43/10 198/460.1 |
| 5,551,531 A | 9/1996 | Dumont | |
| 6,253,906 B1 * | 7/2001 | Hall | B65G 43/10 198/460.1 |
| 6,315,104 B1 * | 11/2001 | Ebert | B65G 43/08 198/460.1 |
| 6,460,683 B1 * | 10/2002 | Pfeiffer | B65G 43/08 198/460.1 |
| 6,550,583 B1 | 4/2003 | Brenhouse | |
| 6,502,707 B1 | 7/2003 | Sullivan | |
| 6,793,043 B2 | 9/2004 | Nguyen | |
| 6,848,567 B2 * | 2/2005 | Kilper | B65G 47/261 198/460.1 |
| 7,072,737 B2 | 7/2006 | Lunak | |
| 7,114,615 B1 * | 10/2006 | Karpy | B65G 21/20 198/860.1 |
| 7,331,471 B1 | 2/2008 | Shakes | |
| 7,542,823 B2 * | 6/2009 | Nagai | B65G 43/10 198/460.1 |
| 7,938,060 B2 | 5/2011 | Manak | |
| 7,984,809 B1 | 7/2011 | Ramey | |
| 8,028,817 B2 * | 10/2011 | Itoh | B65G 47/31 198/460.1 |
| 8,575,507 B2 | 11/2013 | Pippin | |
| 8,855,806 B2 | 10/2014 | Hara | |
| 9,101,232 B1 | 8/2015 | Newman | |
| 9,233,799 B1 | 1/2016 | Mishra | |
| 2004/0129537 A1 | 7/2004 | Belz | |
| 2004/0168893 A1 | 9/2004 | Brixius | |
| 2006/0095373 A1 | 5/2006 | Venkatasubramanien | |
| 2009/0057403 A1 | 3/2009 | Marks | |
| 2009/0090584 A1 | 4/2009 | Chakra | |
| 2011/0266092 A1 | 11/2011 | Marquis | |
| 2011/0288896 A1 | 11/2011 | Dewey | |
| 2012/0241464 A1 | 9/2012 | Adams | |
| 2014/0032427 A1 | 1/2014 | Gannon | |
| 2014/0279272 A1 | 9/2014 | Inman | |
| 2014/0350717 A1 | 11/2014 | Dagle | |
| 2016/0185532 A1 * | 6/2016 | Danelski | B65G 43/10 198/460.1 |
| 2016/0221768 A1 | 8/2016 | Kadaba | |
| 2018/0222620 A1 | 8/2018 | Lewis | |
| 2018/0253683 A1 | 9/2018 | Taylor | |

OTHER PUBLICATIONS

International Search Report and Written Opinion, Application No. PCT/US2018/20574, dated May 18, 2018, 7 pages.
International Search Report and Written Opinion, Application No. PCT/US2018/020576, dated Mar. 2, 2018, dated May 30, 2018, 9 pages.
YouTube, *Taxipost: Automated Parcels Sorting—English*, published on Sep. 30, 2009 and as viewed on Nov. 19, 2018, at https://www.youtube.com/watch?v=vN9XRIAys38, 17 pages (with machine-generated transcript).
YouTube, *Viscon Logistics—Sorting Systems*, Published on Sep. 18, 2014 and viewed on Nov. 19, 2018 at https://www.youtube.com/watch?v=O00gDoGXN98, 5 pages.
International Search Report and Written Opinion, Application No. PCT/US18/15398, dated Mar. 29, 2018, 11 pages.

* cited by examiner

CONVEYOR SYSTEM THAT SENSES AND SEPARATES PRODUCT

CROSS-REFERENCE TO RELATED APPLICATION

The present application claims the benefit of U.S. Provisional Application No. 62/466,095 filed Mar. 2, 2017, which is hereby incorporated herein in its entirety by reference.

TECHNICAL FIELD

Embodiments of the present disclosure relate generally to the field of material transportation systems, in particular conveyor systems for use in automated shipping and receiving environments.

BACKGROUND

Retail stores and warehouses receive often receive multiple shipments of products each day. While some receiving locations can accommodate shipments via boat, airplane, or rail, shipments generally arrive via truck or other road based vehicle. Particularly in retail environments, any given shipment may contain a heterogeneous mix of goods, which need to be routed to a variety of destinations within a store. For example, a single shipment may contain baseball bats and footballs, to be routed to a sporting goods aisle, as well as children's clothing, or electronics. In addition, certain products within a shipment may be immediately required to fill empty shelves, while others may need to be sent to a storage location to prepare for a future need.

In order to minimize labor and effort required to move cases of product from the truck or other shipment vehicle or container, cases of products are often loaded onto a conveyor system. In order to efficiently receive products into inventory from a shipment, automated scanning devices can be used to detect a label, bar code, radio frequency identifier (RFID) tag, or other identifying feature of each case can be used.

The accuracy of scanners can be reduced by the presence of multiple items within a scanning area of a conveyor. Therefore, gapping (also known as separation or singulation) must be performed to provide a minimum distance between conveyed items. While gapping can be performed manually as conveyors are loaded, this can lead to inefficiencies, as humans are often not successful in maintaining ideal gap distances. Conveyor systems that can provide automatic singulation of items exist but conventionally are limited to large and permanent installations.

In retail environments or other situations where space is at a premium, it may be necessary to setup and tear down conveyor systems for the receipt of shipments multiple times daily. In addition, such environments often cannot provide the power requirements needed by larger conveyor systems.

What is needed in the industry, therefore, is a conveyor system that can operate in low-power, temporary environments to reliably singulate goods for efficient scanning.

SUMMARY

Embodiments of the present disclosure meet the need for conveyor systems that can operate in lower-power, temporary environments to singulate conveyed goods for scanning purposes.

Embodiments of the present disclosure include a conveyor system for separating cases of product that includes an elongated, substantially horizontal frame extending from an entry point to an exit point and having a plurality of linear zones, a plurality of individually-controllable motivators arranged along the frame, such that a case placed on one or more motivators will be moved forward towards the exit point by a coordinated movement of the one or more motivators, a plurality of case sensors arranged along the frame to detect the presence of one or more cases within each of the linear zones, and a controller mounted to the frame. The controller can be operably coupled to each of the plurality of case sensors and each of the plurality of motivators.

In embodiments, the controller can be configured to activate the motivators in the zone closest to the exit point to move a case in the exit zone forward to the exit point if a minimum time period has elapsed since a previous case was moved to the exit point, and activate the motivators in each one of the plurality of linear zones that is not the exit zone to move a case in the zone forward to a next one closer to the exit point if no case is present in the next zone closer to the exit point.

In embodiments, the motivators can be o-ring driven rollers operably coupled to a 24-volt direct current (DC) motor. In embodiments, the system can include AC/DC power supply configured to receive 120V alternating current power at 60 Hz and to provide direct current power to the controller, the plurality of case sensors, and the plurality of individually-controllable motivators.

In embodiments, the case sensors can be visible light cameras, photoelectric sensors, or pressure sensors. In embodiments, the connection between the case sensors, the motivators, and the controller can be wired connections or wireless connections.

In embodiments, each of the linear zones is between about 25 inches and about 35 inches long. In embodiments, the controller is further configured to treat the motivators in adjacent zones as a single zone when the presence of a case that is longer than an individual zone is detected.

In embodiments, the minimum time between cases can be three seconds. In embodiments, the minimum time between cases can be selected by an operator via a configuration interface.

In embodiments, the system includes a start/stop button. In embodiments, the system includes casters mounted to the frame such that the frame can be rolled on the casters from one location to another.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
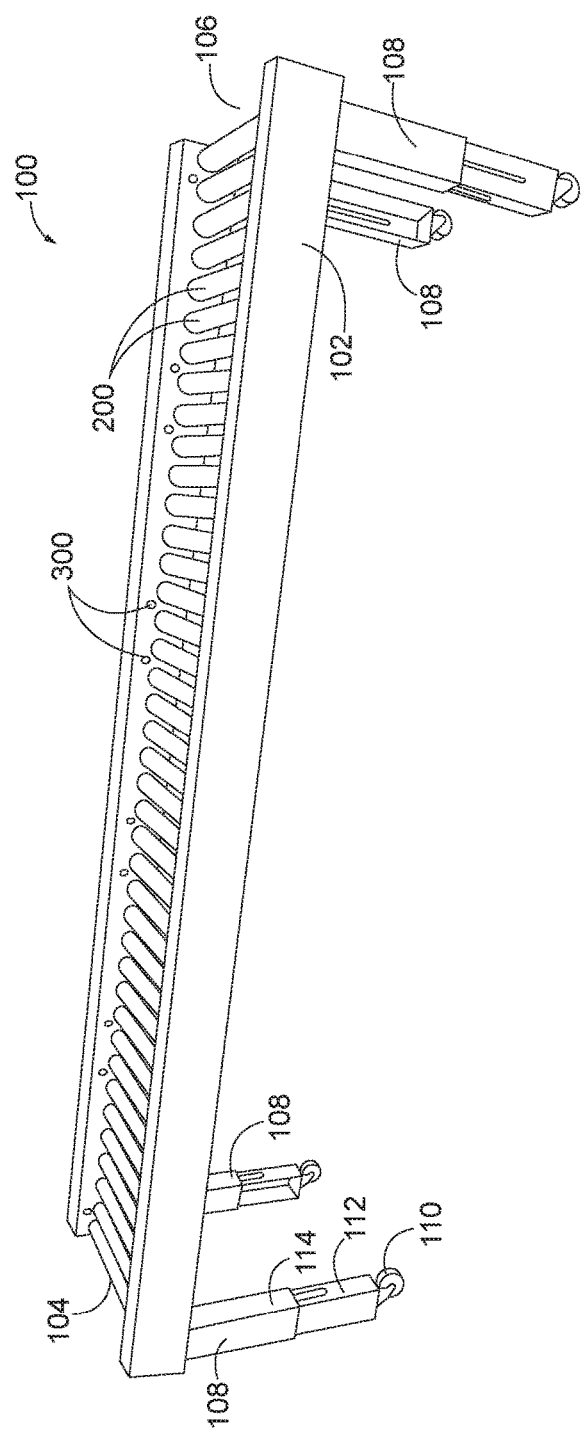
FIG. 1 is a photographic view depicting a conveyor system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a photographic view depicting a conveyor system 100, according to an embodiment. Conveyor system 100 includes an elongated, substantially horizontal frame 102 extending from an entry point 104 to an exit point 106. Frame 102 can comprise legs 108, which can comprise casters 110 in embodiments. In embodiments, legs 108 can comprise inner portion 112 slidably arranged within outer portion 114, enabling the height of legs 108 to be adjusted. Conveyor system 100 comprises a plurality of individually-controllable motivators 200, and a plurality of case sensors 300 arranged along frame 102.

In embodiments, frame 102 can be substantially rigid, as depicted, however in alternate embodiments frame 102 can comprise one or more hinges or other bendable elements (not shown), enabling frame 102 to be arranged in an arcuate configuration. In embodiments, frame 102 can be arranged in one or more curves having minimum inside radius of about nineteen inches.

In embodiments, frame 102 can be collapsible, such that conveyor system 100 can be compacted into a space no larger than about 44 inches deep, about 93 inches wide, and about 40 inches high. In embodiments, the width of motivators 200 can be at least about 24 inches. In embodiments, conveyor system 100 can require no more than about 50 lbf. of force to move on casters 110. Frame 102 can further comprise one or more connection mechanisms, enabling frame 102 to be removably fixed to one or more other conveyors, belts, shelves, frames, or other modules as part of a larger conveyance system. Conveyor system 100 can be arranged as part of a sortation system, such as those depicted and described in U.S. Patent Pub. No. 2017/0330135A1 to Taylor et. al, the disclosure of which is incorporated by reference herein.

Figure 2:
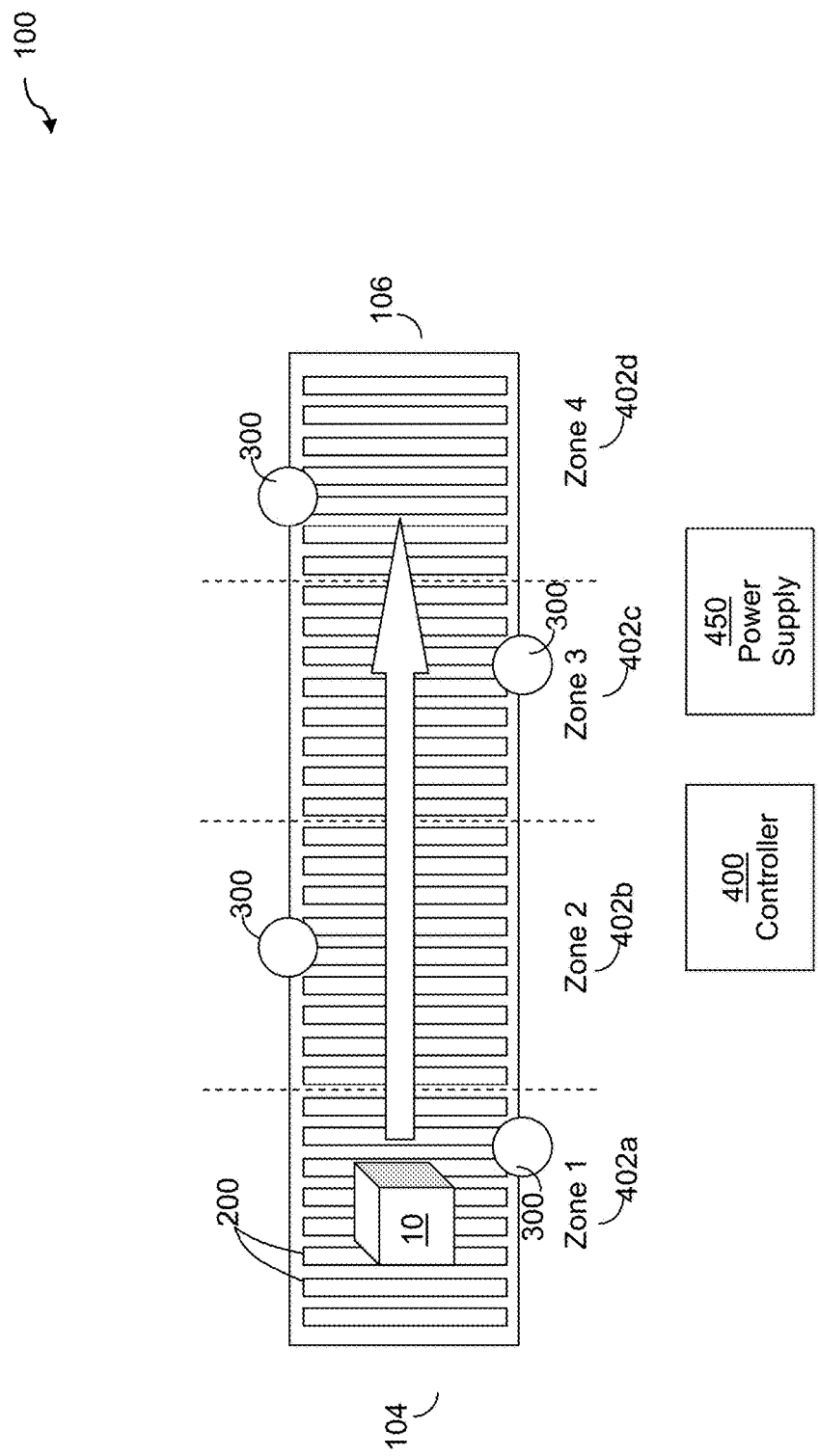
FIG. 2 is a top schematic view depicting a conveyor system, according to an embodiment.

Turning now to FIG. 2, which is a schematic diagram depicting conveyor system 100 according to an embodiment, controller 400 is operably coupled to motivators 200 and case sensors 300. Controller logically divides frame 102 into a plurality of linear zones 402a-d. Each motivator 200 and sensor 300 can be arranged within one or more zones, and each zone 402 can have one or more sensors and motivators arranged therewithin, in embodiments. While four zones 402 are depicted in FIG. 2, frame 102 can comprise more or fewer zones in embodiments, for example, frame 102 can comprise one, two, three, or six zones in embodiments.

In embodiments, the system can include AC/DC power supply 450 configured to receive 110-220 V alternating current power at 60 Hz and 30 A and to provide direct current power to the controller, the plurality of case sensors, and the plurality of individually-controllable motivators.

Figure 3A:
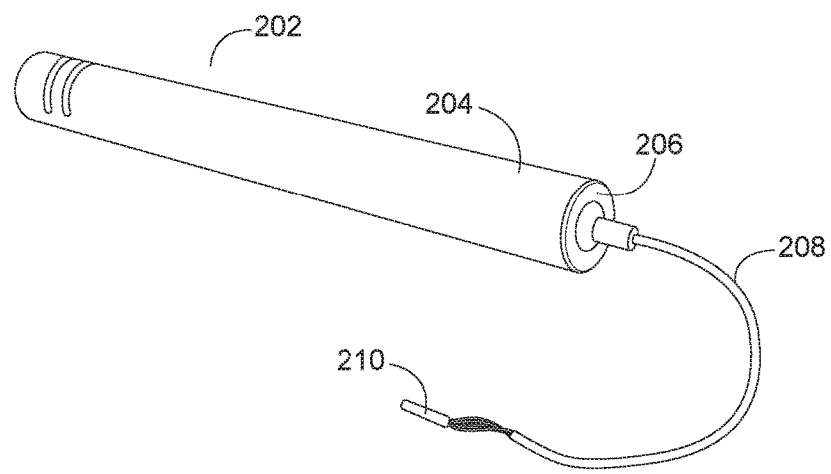
FIG. 3A is a photographic view depicting a roller, according to an embodiment.
Figure 3B:
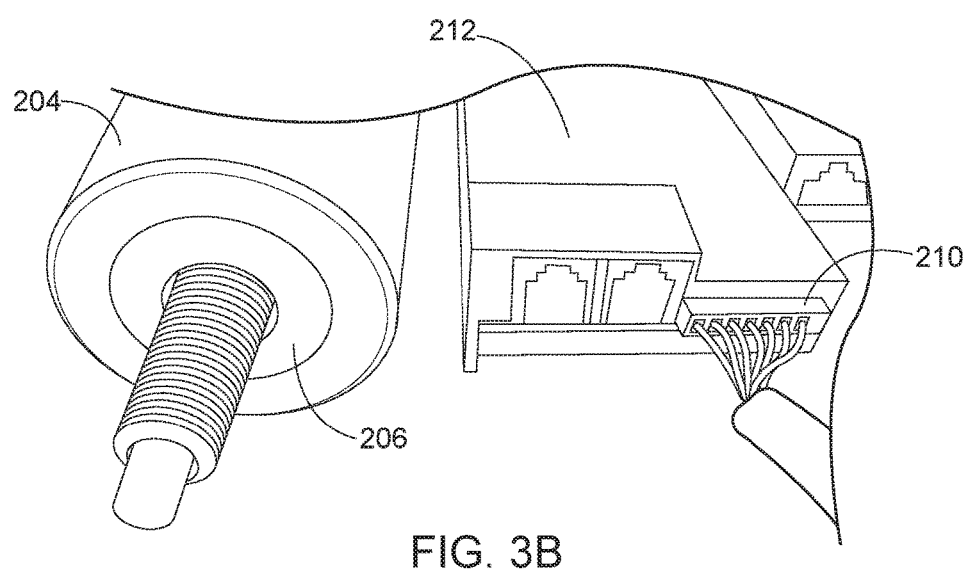
FIG. 3B is a photographic view depicting a roller, according to an embodiment.

As can be seen more clearly in FIGS. 3A and 3B, in embodiments, motivators 200 can comprise 24-volt direct current (DC) driven o-ring rollers 202. Each roller 202 can comprise a body 204, and an internal or external motor 206. Motor 206 can be powered and/or controlled via cable 208, which can be operably coupled to a control card 212. In embodiments, two or more rollers 202 can be operably coupled to a single control card 212. In other embodiments, each roller 202 can be operably coupled to a distinct control card 212. Motivators 200 can comprise other conveyance mechanisms known in the art, including belt-driven rollers, magnetic belts, flat belts, chains or the like, provided that motivators 200 are capable of maintaining a conveyor speed of at least about 110 feet per minute.

In embodiments, case sensors 300 can be visible light cameras, photoelectric sensors, pressure sensors or any other sensor suitable to detect the presence of product within one or more zones 402. In embodiments the connection between the case sensors, the motivators, and the controller can be wired connections or wireless connections.

Returning to FIG. 2, a case 10 can proceed from entry point 104 to exit point 106 by forward activation of motivators 200 in embodiments. Case sensors 300 can detect the presence of a case 10 within zone 402. Controller 400 is configured to activate motivators 200 within each zone 402 in order to maintain a minimum gap, as measured in distance or time between cases as they leave through exit point 106.

In embodiments, controller 400 can activate motivators 200 in a zone 402 synchronously to urge a case 10 at least partially present within zone 402 forward to the next zone closer to exit point 106. In an embodiment, when case sensors 300 in an exit zone adjacent to exit point 106 (Zone 4, 402d as depicted in FIG. 2) detect the presence of a case 10, controller 400 can activate motivators 200 in the exit zone to move a case 10 through exit point 106 if at least a minimum time period has elapsed since the previous case 10 exited. In embodiments, where case sensors 300 in zones 402 that are not exit zones (Zones 1-3, 402a-c as depicted in FIG. 2) detect the presence of a case 10, controller 400 can activate motivators 200 in the non-exit zone if the next zone closest to the exit zone does not contain a case 10.

In other words, controller 400 will activate the motivators 200 within a zone 402 if the following zone is clear. The following zone for the exit zone 402d is clear after a minimum time between cases has elapsed. In embodiments, the minimum time between cases can be determined based on the scanning throughput of a scanning device arranged at exit point 106. In embodiments, the minimum time between cases can be set to about three seconds, though other time periods can be used as needed. In embodiments, controller 400 can present a user interface enabling an human or computerized operator to adjust the minimum time between cases as needed.

In embodiments, controller 400 can be configured to activate motivators 200 to increase the velocity of a case 10 when detected by a case sensor 300. A case 10 can be detected when a portion of the case 10 breaks the plane of a photo-eye sensor. Controller 400 can increase the speed of motivators 200 in the zone immediately preceding the photo-eye sensor by a configured percentage or multiplier (for example, between about 10% and 20%). Controller 400 can further increase the speed of motivators 200 in one or more zones following the photo-eye sensor. The speed increases across zones can be cumulative, such that the second zone following the photo-eye sensor can be faster than the first zone following the photo-eye sensor. Controller 400 can reduces the speed of the activated motivators when the case 10 exits conveyor system 100.

In embodiments, each of the linear zones is between about 25 inches and about 35 inches long, such as about 30 inches long. When case sensors in adjacent zones detect a case 10 that is longer than the zone length, controller 400 can be further configured to treat the motivators in adjacent zones as a single zone for the purpose of moving the case 10 forward to exit point 106.

In embodiments, conveyor system 100 includes at least one optional start-stop button or switch (not shown) enabling additional operator control of conveyor system 100.

Conveyor system 100 can comprise a powered flex conveyor, including a plurality of compactable segments, in some embodiments. Each compactable segment can be about 13.5 feet long when compacted and 28 feet long when fully expanded. Motivators 200 of powered flex conveyor can comprise 1.9 inch rollers and 6"×2" casters. A powered flex conveyor can comprise an electronic drive and handles arranged on every other leg to assist expansion of each collapsible segment.

It should be understood that individual steps used in any methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the conveyor system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A conveyor system for separating cases of product, the system comprising:
    an elongated, substantially horizontal frame extending from an entry point to an exit point and having a plurality of linear zones, one of the plurality of linear zones being adjacent to the exit point and being an exit zone;
    a plurality of individually-controllable motivators arranged along the frame, such that a case placed on one or more motivators will be moved forward towards the exit point by a coordinated movement of the one or more motivators;
    a plurality of case sensors arranged along the frame to detect the presence of one or more cases within each of the linear zones; and
    a controller mounted to the frame and operably coupled to each of the plurality of case sensors and each of the plurality of motivators and configured to:
        activate the motivators in the exit zone to move a case in the exit zone forward to the exit point if a minimum time period has elapsed since a previous case was moved to the exit point, and
        activate the motivators in each one of the plurality of linear zones that is not the exit zone to move a case in the zone forward to a next zone closer to the exit point if no case is present in the next zone closer to the exit point.

2. The system of claim 1, wherein the plurality of case sensors is selected from the group including: visible light cameras, photoelectric sensors, and pressure sensors.

3. The system of claim 1, wherein each of the plurality of individually-controllable motivators comprises an o-ring driven roller operably coupled to a 24-volt direct current (DC) motor.

4. The system of claim 1, further comprising an AC/DC power supply configured to receive 120V alternating current power at 60 Hz and to provide direct current power to the controller, the plurality of case sensors, and the plurality of individually-controllable motivators.

5. The system of claim 1, wherein the plurality of case sensors is operably coupled to the controller via a connection selected from the group including: a wired connection and a wireless connection.

6. The system of claim 1, wherein the plurality of individually-controllable motivators is operably coupled to the controller via a connection selected from the group including: a wired connection and a wireless connection.

7. The system of claim 1, wherein each of the linear zones is between about 25 and about 35 inches long.

8. The system of claim 7, wherein the controller is further configured to treat the motivators in adjacent zones as a single zone when the presence of a case that is longer than an individual zone is detected.

9. The system of claim 1, wherein the minimum time period is three seconds.

10. The system of claim 1, further comprising a configuration interface enabling an operator to select the minimum time period.

11. The system of claim 1, further comprising a start/stop button.

12. The system of claim 1, further comprising casters mounted to the frame such that the frame can be rolled on the casters from one location to another.

* * * * *